United States Patent
Kim et al.

(10) Patent No.: US 10,967,850 B2
(45) Date of Patent: Apr. 6, 2021

(54) APPARATUS AND METHOD FOR CONTROLLING DRIVING OF VEHICLE, AND VEHICLE SYSTEM

(71) Applicants: Hyundai Motor Company, Seoul (KR); Kia Motors Corporation, Seoul (KR)

(72) Inventors: Yeon Bok Kim, Gyeonggi-do (KR); Tae Woo Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 161 days.

(21) Appl. No.: 16/193,100

(22) Filed: Nov. 16, 2018

(65) Prior Publication Data
US 2020/0114902 A1   Apr. 16, 2020

(30) Foreign Application Priority Data

Oct. 11, 2018   (KR) .................. 10-2018-0121243

(51) Int. Cl.
*B60W 20/50* (2016.01)
*B60L 15/20* (2006.01)
(Continued)

(52) U.S. Cl.
CPC .............. *B60W 20/50* (2013.01); *B60L 15/20* (2013.01); *B60W 10/08* (2013.01);
(Continued)

(58) Field of Classification Search
CPC ............ B60W 20/50; B60W 10/08; B60W 30/18036; B60W 2510/0208;
(Continued)

(56) References Cited

U.S. PATENT DOCUMENTS

2006/0230854 A1* 10/2006 Enstrom ................ B60K 6/547
74/331
2017/0240038 A1* 8/2017 Spangler .............. B60W 10/119
(Continued)

FOREIGN PATENT DOCUMENTS

DE    10 2015 224647 A1    6/2017
DE    102016209939 A1 * 12/2017 ............ B60W 20/50
(Continued)

OTHER PUBLICATIONS

English_Translation_JP2012144171A (Year: 2012).*
(Continued)

*Primary Examiner* — Peter D Nolan
*Assistant Examiner* — Ashley L Redhead, Jr.
(74) *Attorney, Agent, or Firm* — Mintz Levin Cohn Ferris Glovsky and Popeo, P.C.; Peter F. Corless

(57) ABSTRACT

An apparatus and method for controlling driving of a vehicle, and a vehicle system are provided. The apparatus according to the present disclosure includes a determination device that determines a closed state of an engine clutch, based on a state of a motor or an engine of the vehicle when a state of the engine clutch is unknown by an engine clutch controller. A state determination device receives information from the determination device to thus determine whether the engine clutch is in a closed or open state. A motor controller allows reverse rotation of the motor for reverse driving control of the vehicle in response to determining that the engine clutch is in the open state.

15 Claims, 7 Drawing Sheets

(51) Int. Cl.
    *B60W 10/08*    (2006.01)
    *B60W 30/18*    (2012.01)
(52) U.S. Cl.
    CPC .. *B60W 30/18036* (2013.01); *B60L 2240/421* (2013.01); *B60L 2240/423* (2013.01); *B60L 2240/441* (2013.01); *B60L 2240/50* (2013.01); *B60W 2510/0208* (2013.01); *B60W 2510/0638* (2013.01); *B60W 2510/081* (2013.01); *B60W 2510/083* (2013.01); *B60W 2710/081* (2013.01); *B60W 2710/083* (2013.01); *B60Y 2200/92* (2013.01)
(58) Field of Classification Search
    CPC ... B60W 2510/0638; B60W 2510/081; B60W 2510/083; B60W 2710/081; B60W 2710/083; B60W 10/02; B60W 10/06; B60W 50/0205; B60L 15/20; B60L 2240/421; B60L 2240/423; B60L 2240/441; B60L 2240/50; B60Y 2200/92; B60K 6/48; B60K 2006/4825; B60K 2006/541
    See application file for complete search history.

(56) References Cited

U.S. PATENT DOCUMENTS

2018/0022200 A1* 1/2018 Trent ..................... F16D 27/10
                                                    192/46
2018/0066718 A1   3/2018 Kim et al.

FOREIGN PATENT DOCUMENTS

| JP | 2012144171 A | * | 8/2012 | |
| JP | 2013129274 A | * | 7/2013 | |
| KR | 2010-0011727 A | | 2/2010 | |
| WO | WO-2014162838 A1 | * | 10/2014 | ............... B60K 6/48 |

OTHER PUBLICATIONS

English_Translation_WO2014162838A1 (Year: 2014).*
English_Translation_JP2013129274A (Year: 2013).*
English_Translation_DE102016209939A1 (Year: 2016).*

* cited by examiner

| CLASSIFICATION | POSSIBILITY OF REVERSE DRIVING ||
|---|---|---|
| | (A) | (B) |
| Unknown | IMPOSSIBLE | (OPEN DETERMINED) : POSSIBLE<br>(OPEN UNKNOWN) : IMPOSSIBLE |
| Open | POSSIBLE | POSSIBLE |
| Slip | IMPOSSIBLE | IMPOSSIBLE |
| Lock | IMPOSSIBLE | IMPOSSIBLE |

FIG.4

APPARATUS AND METHOD FOR CONTROLLING DRIVING OF VEHICLE, AND VEHICLE SYSTEM

CROSS-REFERENCE TO RELATED APPLICATION

This application is claims the benefit of priority to Korean Patent Application No. 10-2018-0121243, filed on Oct. 11, 2018, the entire contents of which are incorporated herein by reference.

TECHNICAL FIELD

The present disclosure relates to an apparatus and method for controlling driving of a vehicle, and a vehicle system, and more particularly to a vehicle driving control apparatus and method that determine an engine clutch state based on states of a hybrid starter generator, an engine, and a motor.

BACKGROUND

An engine clutch system of a hybrid vehicle is mounted between an engine and an electric motor to transfer or block the driving force of the engine based on a driver's request and the vehicle's state, thereby enabling the vehicle to drive in an electric vehicle (EV) mode and a hybrid electric vehicle (HEY) mode. When it is difficult to determine the state of an engine clutch using an engine clutch controller, the engine clutch system determines the state of the engine clutch to be "unknown". When the state of the engine clutch is determined to be "unknown" in the hybrid vehicle from which a reverse (R) gear is removed, the engine may rotate in reverse due to lockup of the engine clutch when the motor rotates in reverse for reverse driving control, and therefore reverse driving may be impossible.

SUMMARY

The present disclosure provides a vehicle driving control apparatus and method and a vehicle system that, even when it is impossible to determine the state of an engine clutch in a hybrid vehicle from which an R gear is removed, determine the state of the engine clutch based on the states of a hybrid starter generator (HSG), an engine, and a motor and allow reverse rotation of the motor, thereby enabling reverse driving control without damage to hardware apparatuses and improving a driver's satisfaction with driving. The technical problems to be solved by the present inventive concept are not limited to the aforementioned problems, and any other technical problems not mentioned herein will be clearly understood from the following description by those skilled in the aft to which the present disclosure pertains.

According to an aspect of the present disclosure, an apparatus for controlling driving of a vehicle may include a determination device configured to determine a closed state of an engine clutch, based on a state of a motor or an engine of the vehicle when a state of the engine clutch is unknown by an engine clutch controller, a state determination device configured to determine whether the engine clutch is in a closed or open state, based on the determination result, and a motor controller configured to allow reverse rotation of the motor for reverse driving control of the vehicle in response to determining that the engine clutch is in an open state.

The apparatus may further include a driving controller configured to adjust an HSG speed and a motor torque when an R stage signal is applied with the state of the engine clutch unknown. The driving controller may be configured to adjust the HSG speed to "0" and the motor torque to a first torque within an HSG torque range. The first torque may have a negative value. The determination device may be configured to determine the closed state of the engine clutch based on a change in an HSG torque, with the HSG speed and the motor torque adjusted.

Additionally, the determination device may be configured to determine that the engine clutch is in an open state when an absolute value of the HSG torque does not exceed a preset second torque for a predetermined period of time, and determine that the engine clutch is in a closed state when an absolute value of the HSG torque exceeds a preset second torque for a predetermined period of time. The determination device may also be configured to determine whether a motor speed exceeds a preset first speed when a drive (D) stage signal is applied with the state of the engine clutch unknown. When the motor speed exceeds the first speed, the determination device may be configured to determine the closed state of the engine clutch based on whether an engine speed is less than a preset second speed.

The determination device may further be configured to determine that the engine clutch is in an open state when the engine speed is less than the preset second speed for a predetermined period of time, and may be configured to determine that the engine clutch is in a closed state when the engine speed is greater than the preset second speed for a predetermined period of time. The state determination device may be configured to determine that the engine clutch is in a closed state when it is unknown from the determination result of the determination device during application of an R or D stage signal that the engine clutch is in a closed state or in an open state. The motor controller may then be configured to restrict the reverse rotation of the motor for the reverse driving control of the vehicle in response to determining that the engine clutch is not in an open state (e.g., is in a closed state). The vehicle may be a hybrid vehicle from which an R gear is removed.

According to another aspect of the present disclosure, a method for controlling driving of a vehicle may include determining a closed state of an engine clutch, based on a state of a motor or an engine of the vehicle when a state of the engine clutch is unknown by an engine clutch controller, determining whether the engine clutch is in a closed or open state, based on the determination result, and allowing reverse rotation of the motor for reverse driving control of the vehicle in response to determining that the engine clutch is in an open state.

According to another aspect of the present disclosure, a vehicle system may include an engine clutch configured to couple or release an engine and a motor of a vehicle, an engine clutch controller configured to control a closed state or an open state of the engine clutch, and a driving control apparatus configured to determine whether the engine clutch is in a closed or open state, based on a state of the motor or the engine of the vehicle when a state of the engine clutch is unknown by the engine clutch controller and allow reverse rotation of the motor for reverse driving control of the vehicle in response to determining that the engine clutch is in an open state.

BRIEF DESCRIPTION OF THE DRAWINGS

The above and other objects, features and advantages of the present disclosure will be more apparent from the following detailed description taken in conjunction with the accompanying drawings:

FIGS. 3 and 4 are views illustrating embodiments referral to in a description of an operation of the vehicle driving control apparatus according to an exemplary embodiment of the present disclosure;

DETAILED DESCRIPTION

Figure 1:
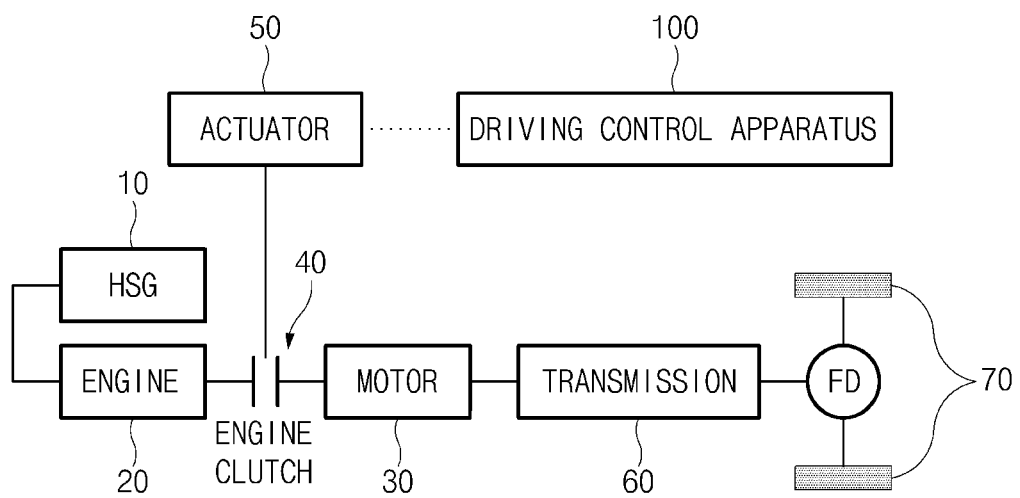
FIG. 1 is a view illustrating a vehicle system to which a vehicle driving control apparatus is applied, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. It should be understood that even if shown in different drawings, identical elements are provided with identical reference numerals in the drawings. Furthermore, in describing the exemplary embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An apparatus and method for controlling driving of a vehicle, and a vehicle system according to the present disclosure may be applied to vehicles, such as hybrid electric vehicles (HEVs) and/or plug-in hybrid electric vehicles (PHEVs), which have an engine and a motor as power sources. Therefore, a vehicle to be described below includes a hybrid electric vehicle (HEY) and/or a plug-in hybrid electric vehicle (PHEV). Furthermore, the vehicle according to an exemplary embodiment of the present disclosure may be a vehicle from which a reverse (R) gear is removed.

FIG. 1 is a view illustrating a vehicle system to which a vehicle driving control apparatus is applied, according to an exemplary embodiment of the present disclosure. Referring to FIG. 1, the vehicle system may include a hybrid starter generator (HSG) 10, an engine 20, a motor 30, an engine clutch 40, an actuator 50, a transmission 60, and wheels 70. In addition, the vehicle system may include a driving control apparatus 100 configured to control reverse driving of the vehicle based on the state of the engine clutch 40. In particular, the driving control apparatus 100 may be driven as a hybrid control unit (HCU).

The HSG 10 may be configured to provide power when the vehicle starts, and the engine 20 and the motor 30 provide power required to drive the vehicle. The vehicle may operate in an electric vehicle (EV) mode in which the motor 30 operates as a power source and in a hybrid electric vehicle (HEY) mode in which the engine 20 and the motor 30 operate as power sources. The engine clutch 40 may be disposed between the engine 20 and the motor 30 and may be closed or opened by the actuator 50.

The driving control apparatus 100 may be operated by a controller to determine the driving mode of the vehicle to be the EV mode or the HEV mode based on the states of the engine 20, the motor 30, and wheels 70 and a driver's request, calculate transfer torque required to close or open the engine clutch 40 based on the determined driving mode, and operate the actuator 50 based on the calculated transfer torque. The actuator 50 may be configured to operate as an engine clutch controller and allow the engine clutch 40 to be closed or opened based on the control of the driving control apparatus 100. The actuator 50 may be configured to provide information regarding the state of the engine clutch 40 to the driving control apparatus 100.

For the vehicle from which an R gear is removed, the driving control apparatus 100 may be configured to operate the actuator 50 to allow the engine clutch 40 to be opened for reverse driving. In response to determining by the actuator 50 that the engine clutch 40 is in an open state, the driving control apparatus 100 may be configured to rotate the motor 30 in reverse and execute reverse driving of the vehicle. Meanwhile, when the state of the engine clutch 40 is unknown by the actuator 50 (e.g., unable to be determined by the actuator), the driving control apparatus 100 may be configured to allow or restrict reverse driving by determining whether the engine clutch 40 is in a closed or open state, based on a variation in an HSG torque by the operation of the HSG 10 and the motor 30.

Figure 2:
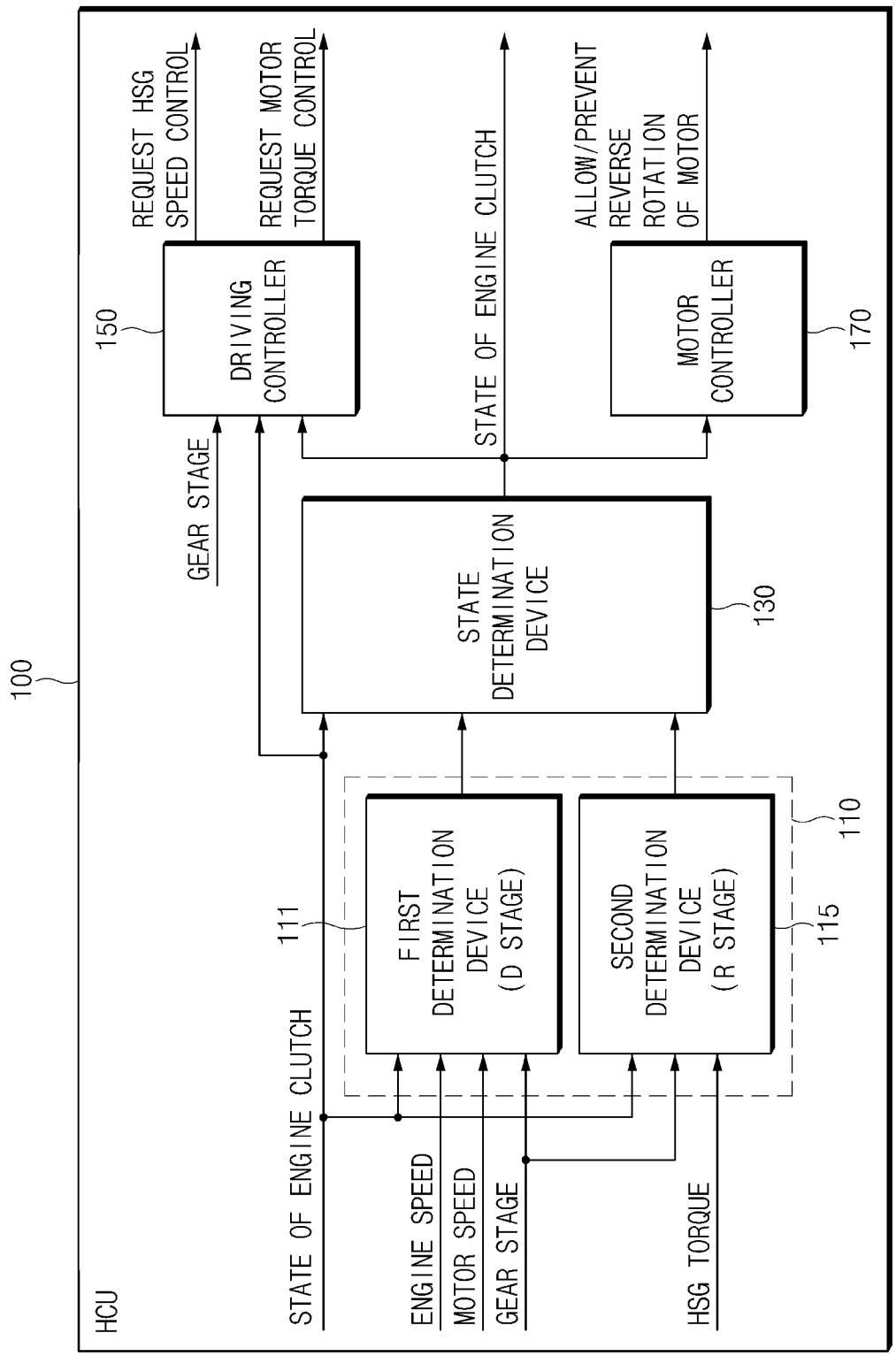
FIG. 2 is a view illustrating a configuration of the vehicle driving control apparatus according to an exemplary embodiment of the present disclosure.

Hereinafter, a detailed configuration of the driving control apparatus 100 will be described in more detail with reference to FIG. 2. FIG. 2 is a view illustrating a configuration of the driving control apparatus according to an exemplary embodiment of the present disclosure.

Referring to FIG. 2, the driving control apparatus 100 may include a determination device 110, a state determination device 130, a driving controller 150, and a motor controller 170. In particular, the determination device 110, the state determination device 130, the driving controller 150, and the motor controller 170 of the driving control apparatus 100 according to the exemplary embodiment of the present disclosure may be implemented as one or more processors.

When the state of the engine clutch 40 is unknown, the determination device 110 may be configured to determine whether the engine clutch 40 is in a closed or open state, based on information regarding the state of the vehicle. The determination device 110 may include a first determination device 111 configured to determine whether the engine clutch 40 is in an open state when a drive (D) stage signal is applied and a second determination device 115 configured to determine whether the engine clutch 40 is in an open state when an R stage signal is applied. When the state of the engine clutch 40 is unknown, the first determination device 111 may be configured to determine whether the engine clutch 40 is in an open state, based on a motor speed and an engine speed when a D stage signal is applied. The vehicle may be driven in an EV mode when the state of the engine clutch 40 is unknown.

Since the first determination device 111 may misjudge the state of the engine clutch 40 in a stop state of the vehicle, that is, when both the motor speed and the engine speed are 0 rpm, the first determination device 111 may be configured to determine whether the engine clutch 40 is in an open state, when the motor speed is greater than or equal to a first speed, for example, α rpm. When the engine clutch 40 is in an open state and the vehicle is being driven in the EV mode, the engine speed is not generated even though the motor speed is greater than or equal to the first speed. Therefore, the first determination device 111 may be configured to determine whether the engine clutch 40 is in an open state, based on whether the engine speed greater than or equal to a second speed is generated in the state in which the motor speed is greater than or equal to the first speed.

For example, when it is determined that the engine speed is less than the second speed, for example, β rpm for a predetermined period of time t1 in the state in which the motor speed is greater than or equal to the first speed, the first determination device 111 may be configured to determine that the engine clutch 40 is in an open state. Meanwhile, in response to determining that the engine speed is greater than or equal to the second speed for the predetermined period of time t1 in the state in which the motor speed is greater than or equal to the first speed, the first determination device 111 may be configured to determine that the engine clutch 40 is not in an open state (e.g., is in a closed state). In particular, β has a value close to "0". When an R stage signal is applied with the state of the engine clutch 40 unknown, the driving controller 150 may be configured to adjust an HSG speed and a motor torque. For example, the driving controller 150 may be configured to adjust the HSG speed to be about 0 rpm and the motor torque to a first torque, for example, −γ Nm. Since the driving controller 150 may be configured to adjust the motor torque within an HSG torque range, the vehicle does not move due to the motor torque.

When the engine clutch 40 is not in an open state (e.g., is in a closed state), the HSG 10 may be configured to generate a predetermined amount of torque to maintain the speed at 0 rpm when the HSG speed is 0 rpm and the motor torque of −γ Nm is applied within the HSG torque range. Accordingly, the second determination device 115 may be configured to determine whether the engine clutch 40 is in an open state, based on whether the HSG torque exceeding a second torque is generated in the state in which the HSG speed and the motor torque are adjusted by the driving controller 150. For example, in response to determining that the absolute value of the HSG torque is less than or equal to a second torque, for example, ε Nm for a predetermined period of time t2 in the state in which the HSG speed is adjusted to 0 rpm and the motor torque of −γ Nm is applied, the second determination device 115 may be configured to determine that the engine clutch 40 is in an open state. In particular, t2 and ε may have values close to "0".

Figure 3:
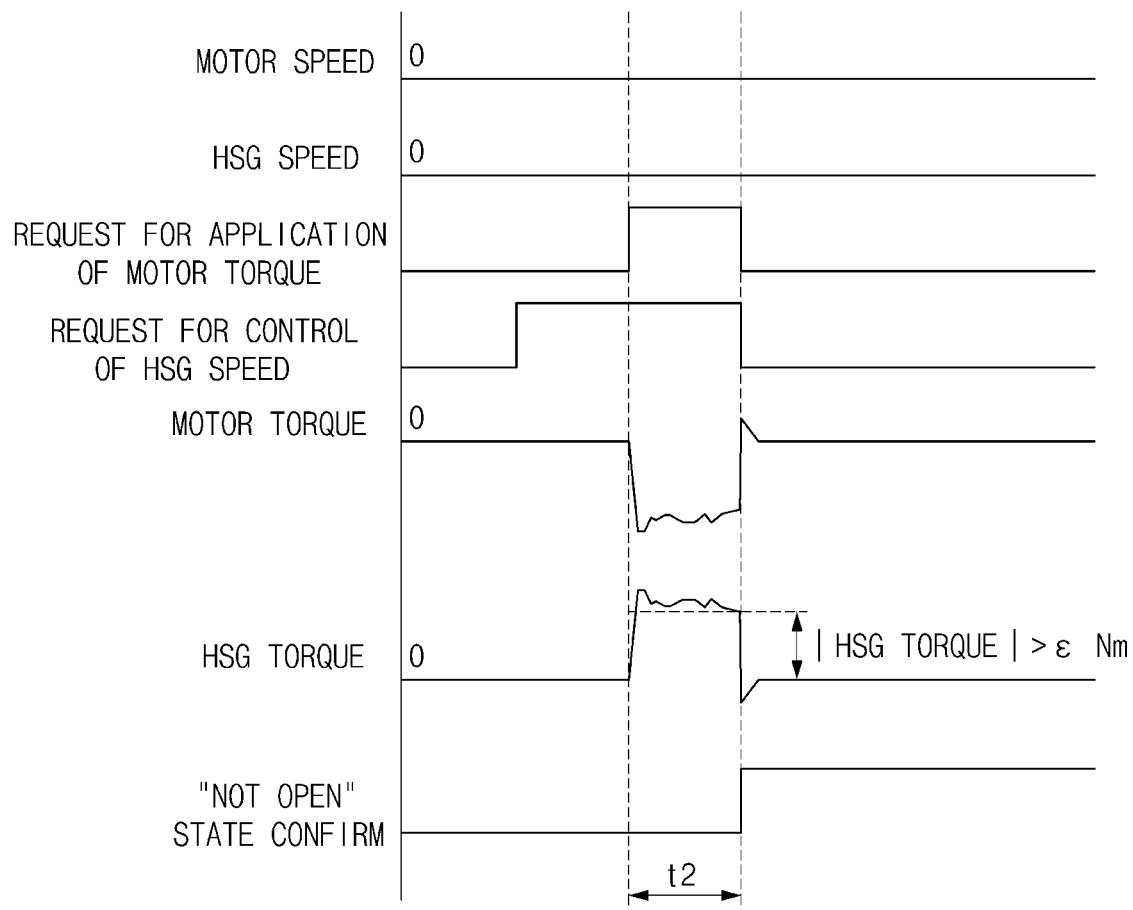

Furthermore, in response to determining that the absolute value of the HSG torque exceeds the second torque for the predetermined period of time t2 in the state in which the HSG speed is adjusted to 0 rpm and the motor torque of −γ Nm is applied, the second determination device 115 may be configured to determine that the engine clutch 40 is not in an open state (e.g., is in the closed state). The state of the vehicle when the second determination device 115 determines that the engine clutch 40 is not in an open state may be represented as illustrated in FIG. 3.

Particularly, the state determination device 130 may be configured to determine the state of the engine clutch 40 based on the determination results of the first determination device 111 and/or the second determination device 115. In response to determining by any one of the first determination device 111 and/or the second determination device 115 that the engine clutch 40 is or is not in an open state, the state determination device 130 may be configured to determine the state of the engine clutch 40 according to the result. The state determination device 130 may be configured to determine the state of the engine clutch 40, based on a most recently received value among the determination results of the first determination device 111 and/or the second determination device 115. When it is not determined by any one of the determination results of the first determination device

111 and/or the second determination device 115 that the engine clutch 40 is or is not in an open state, the state determination device 130 may be configured to confirm that the engine clutch 40 is not in an open state (e.g., is in a closed state).

The motor controller 170 may be configured to allow or restrict reverse rotation of the motor 30 during reverse driving control, based on the state of the engine clutch 40 determined by the state determination device 130. The driving control apparatus 100 according to the exemplary embodiment of the present disclosure, which operates as described above, may be implemented in the form of an independent hardware device that includes memory and a processor that processes each operation, and may be driven in the form included in another hardware device such as a microprocessor or a generic-purpose computer system.

FIG. 4 is a view illustrating reverse driving control states by the driving control apparatus according to an exemplary embodiment of the present disclosure. Referring to FIG. 4, (A) represents reverse driving control states for respective engine clutch states in the related art, and (B) represents reverse driving control states for respective engine clutch states by the driving control apparatus 100 according to the present disclosure.

In the related art, reverse driving is impossible even when the state of the engine clutch 40 is unknown, as well as when the engine clutch 40 is in a slip or lock state. Meanwhile, the driving control apparatus 100 according to the present disclosure does not unconditionally restrict reverse driving when the state of the engine clutch 40 is unknown during reverse driving control. In particular, the driving control apparatus 100 of the present disclosure may be configured to determine the state of the engine clutch 40 based on the state of the vehicle and allow reverse rotation of the motor 30 to enable reverse driving control in response to confirming that the engine clutch 40 is in an open state. The driving control apparatus 100 may be configured to perform reverse driving control without damaging hardware by reversely rotating the motor 30 with the state of the engine clutch 40 unknown, thereby improving a driver's satisfaction with driving.

Figure 5:
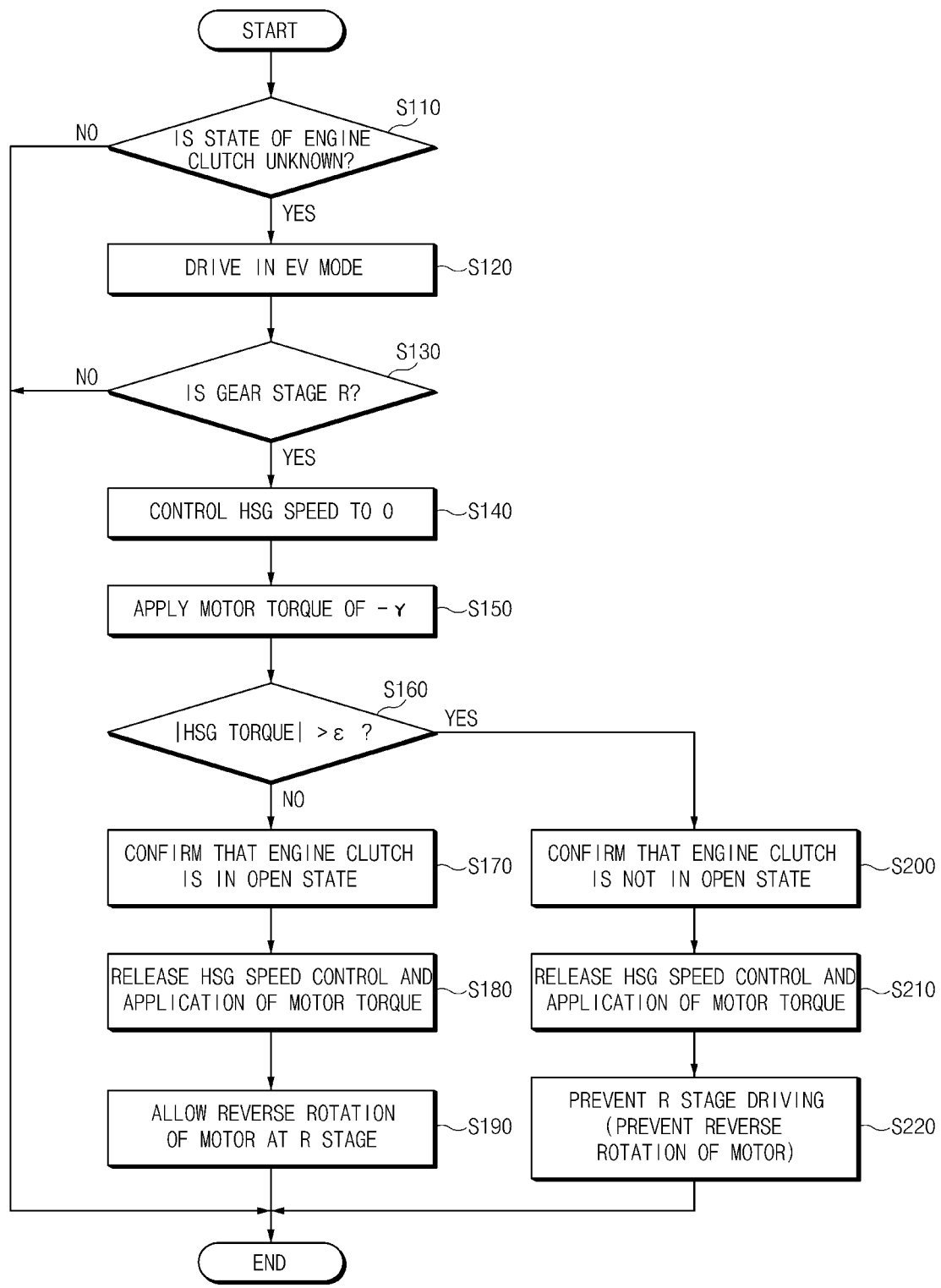
FIGS. 5 and 6 are flowcharts illustrating a vehicle driving control method according to an exemplary embodiment of the present disclosure.
Figure 6:
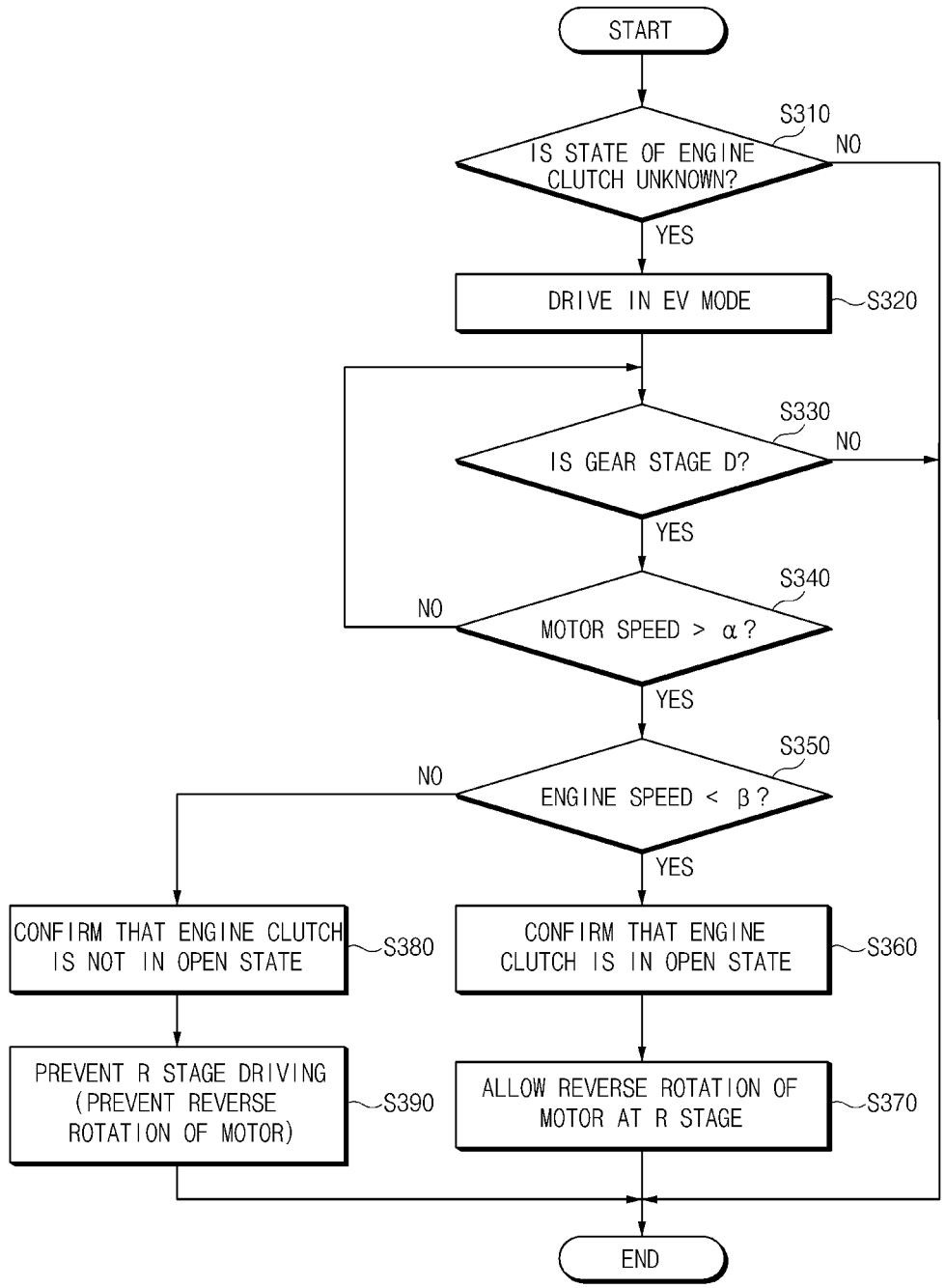

An operation of the above-configured driving control apparatus 100 according to the present disclosure will be described below in more detail. FIGS. 5 and 6 are flowcharts illustrating a vehicle driving control method according to an exemplary embodiment of the present disclosure.

FIG. 5 is a flowchart illustrating an operation of controlling reverse driving by determining the state of the engine clutch 40 when an R stage signal is applied with the state of the engine clutch 40 unknown. Referring to FIG. 5, when the state of the engine clutch 40 is unknown (Step S110), the driving control apparatus 100 may be configured to operate the vehicle to drive in an EV mode (Step S120).

When an R stage signal is applied (Step S130), the driving control apparatus 100 may be configured to adjust the HSG speed to about 0 rpm (S140) and the motor torque to the first torque (e.g., $-\gamma$ Nm) (Step S150). Thereafter, the driving control apparatus 100 may be configured to determine the HSG torque. In response to determining that the absolute value of the HSG torque exceeds $\varepsilon$ Nm for the predetermined period of time t2 (Step S160), the driving control apparatus 100 may be configured to confirm that the engine clutch 40 is not in an open state (Step S200). After the state of the engine clutch 40 is confirmed, the driving control apparatus 100 may be configured to release the HSG speed control and the application of the motor torque in steps S140 and S150 (Step S210) and restrict reverse rotation of the motor 30 and R stage driving (Step S220).

In response to determining in step S160 that the absolute value of the HSG torque does not exceed $\varepsilon$ Nm for the predetermined period of time t2, the driving control apparatus 100 may be configured to confirm that the engine clutch 40 is in an open state (Step S170). After the state of the engine clutch 40 is determined, the driving control apparatus 100 may be configured to release the HSG speed control (e.g., adjustment) and the application of the motor torque in steps S140 and S150 (Step S180) and allow reverse rotation of the motor 30 at the R stage (Step S190).

FIG. 6 is a flowchart illustrating an operation of controlling reverse driving by determining the state of the engine clutch 40 when a D stage signal is applied with the state of the engine clutch 40 unknown. Referring to FIG. 6, when the state of the engine clutch 40 is unknown (Step S310), the driving control apparatus 100 may be configured to operate the vehicle to drive in an EV mode (Step S320).

When a D stage signal is applied (Step S330), the driving control apparatus 100 may be configured to determine whether the motor speed is greater than or equal to the first speed (e.g., $\alpha$ rpm) (Step S340). In response to determining in step S340 that the motor speed is greater than or equal to the first speed (e.g., $\alpha$ rpm), the driving control apparatus 100 may be configured to determine whether the engine speed is less than the second speed (e.g., $\beta$ rpm) for the predetermined period of time t1 (Step S350).

Further, in response to determining in step S350 that the engine speed is less than the second speed (e.g., $\beta$ rpm), the driving control apparatus 100 may be configured to determine that the engine clutch 40 is in an open state (Step S360) and allow reverse rotation of the motor 30 at the R stage (Step S370). In response to determining in step S350 that the engine speed is greater than the second speed (e.g., $\beta$ rpm), the driving control apparatus 100 may be configured to determine that the engine clutch 40 is not in an open state (Step S380) and restrict reverse rotation of the motor 30 and R stage driving (Step S390).

Figure 7:
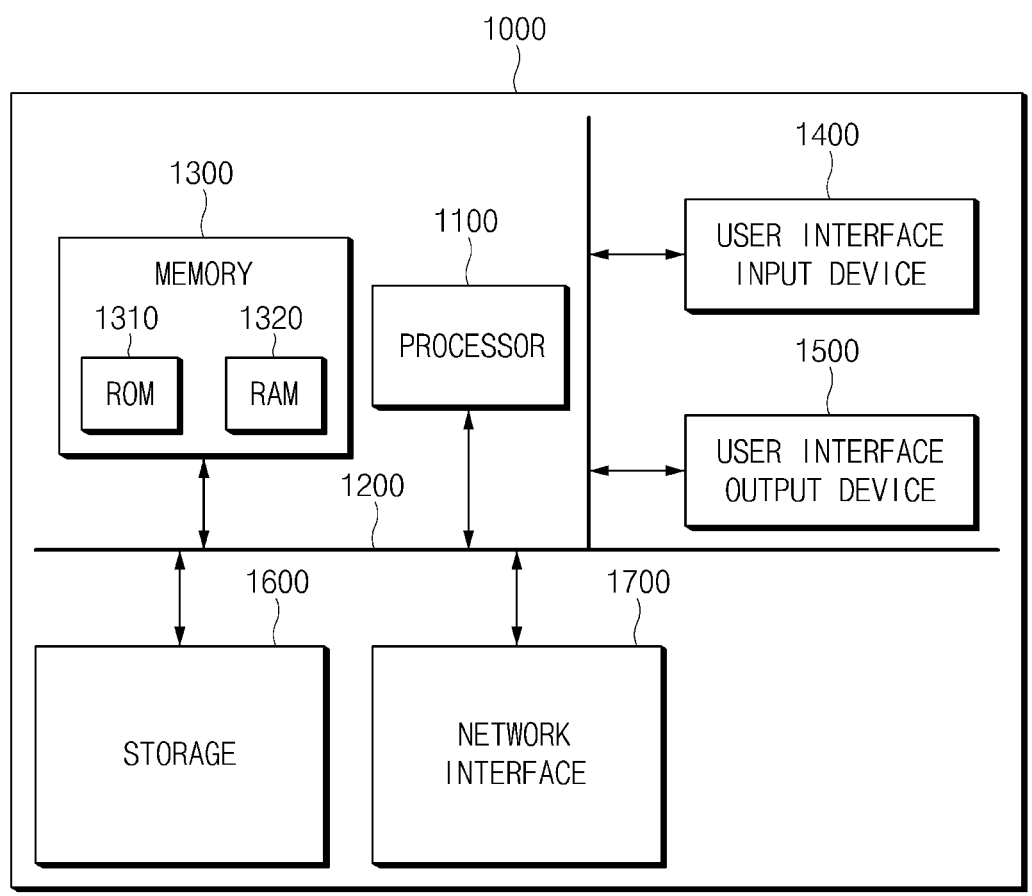
FIG. 7 is a view illustrating a computing system in which a method according to an exemplary embodiment of the present disclosure is executed.

FIG. 7 is a view illustrating a computing system in which a method according to an exemplary embodiment of the present disclosure is executed. Referring to FIG. 7, a computing system 1000 may include at least one processor 1100, memory 1300, a user interface input device 1400, a user interface output device 1500, storage 1600, and a network interface 1700 that are connected together via a bus 1200. The processor 1100 may be a central processing unit (CPU) or a semiconductor device configured to execute instructions stored in the memory 1300 and/or the storage 1600. The memory 1300 and the storage 1600 may include various types of volatile or non-volatile storage mediums. For example, the memory 1300 may include a read only memory (ROM) 1310 and a random access memory (RAM) 1320.

Accordingly, the steps of the methods or algorithms described above in relation to the embodiments disclosed herein may be directly implemented with a hardware module or a software module executed by the processor 1100, or a combination thereof. The software module may reside in a storage medium (e.g., the memory 1300 and/or the storage 1600) such as a RAM memory, a flash memory, a ROM memory, an EPROM memory, an EEPROM memory, a register, a hard disk, a detachable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside in a user terminal. In another case, the processor 1100 and the storage medium may reside in the user terminal as separate components.

According to the present disclosure, even when it is impossible to determine the state of the engine clutch in the hybrid vehicle from which the R gear is removed, reverse rotation of the motor may be allowed by determining the state of the engine clutch based on the states of the HSG, the engine, and the motor, thereby having an advantage of enabling reverse driving control without damage to hardware apparatuses and improving a driver's satisfaction with driving.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. An apparatus for controlling driving of a vehicle, comprising:
    a determination device configured to determine a closed state of an engine clutch, based on a state of a motor or an engine of the vehicle when a state of the engine clutch is unknown by an engine clutch controller;
    a state determination device configured to receive state information from the determination device to determine whether the engine clutch is in a closed state or an open state; and
    a motor controller configured to control reverse rotation of the motor for reverse driving control of the vehicle in response to determining that the engine clutch is in the open state,
    wherein when a reverse (R) stage signal is applied with the state of the engine clutch unknown, a driving controller is configured to adjust a hybrid starter generator (HSG) speed to 0 and a motor torque of the motor to a first torque within an HSG torque range, and
    wherein the determination device is configured to determine that the engine clutch is in the open state when an absolute value of an HSG torque is less than a preset second torque for a predetermined period of time that the HSG speed and the motor torque of the motor is adjusted.

2. The apparatus of claim 1, wherein the first torque has a negative value.

3. The apparatus of claim 1, wherein the determination device is configured to determine that the engine clutch is in the closed state when the absolute value of the HSG torque excess the preset second torque for the predetermined period of time.

4. The apparatus of claim 1, wherein the determination device is configured to determine whether a motor speed exceeds a preset first speed when a drive (D) stage signal is applied with the state of the engine clutch unknown.

5. The apparatus of claim 4, wherein when the motor speed exceeds the first speed, the determination device is configured to determine the closed state of the engine clutch based on whether an engine speed is less than a preset second speed.

6. The apparatus of claim 5, wherein the determination device is configured to determine that the engine clutch is in the open state when the engine speed is less than the preset second speed for a predetermined period of time and the determination device is configured to determine that the engine clutch is in the closed state when the engine speed is greater than the preset second speed for the predetermined period of time.

7. The apparatus of claim 1, wherein the state determination device is configured to determine that the engine clutch is in the closed state when it is unknown from the determination result of the determination device during application of a reverse (R) or drive (D) stage signal that the engine clutch is in the closed state or in the open state.

8. The apparatus of claim 1, wherein the motor controller is configured to control the reverse rotation of the motor for the reverse driving control of the vehicle in response to determining that the engine clutch is in the closed state.

9. The apparatus of claim 1, wherein the vehicle is a hybrid vehicle from which a reverse (R) gear is removed.

10. A method for controlling driving of a vehicle, comprising:
    determining, by a processor, a closed state of an engine clutch, based on a state of a motor or an engine of the vehicle when a state of the engine clutch is unknown by an engine clutch controller;
    determining, by the processor, whether the engine clutch is in a closed or open state, based on a determination result when the state of the engine clutch is unknown; and
    controlling, by the processor, reverse rotation of the motor for reverse driving control of the vehicle in response to determining that the engine clutch is in the open state,
    wherein when a reverse (R) stage signal is applied with the state of the engine clutch unknown, the processor is configured to adjust a hybrid starter generator (HSG) speed to 0 and a motor torque of the motor to a first torque within an HSG torque range, and
    wherein the processor is configured to determine that the engine clutch is in the open state when an absolute value of an HSG torque is less than a preset second torque for a predetermined period of time that the HSG speed and the motor torque of the motor is adjusted.

11. The method of claim 10, wherein the determining of the closed state of the engine clutch includes:
    determining, by the processor, that the engine clutch is in the closed state when the absolute value of the HSG torque is greater than the preset second torque for the predetermined period of time.

12. The method of claim 10, wherein the determining of the closed state of the engine clutch includes:
    determining, by the processor, whether a motor speed exceeds a preset first speed when a drive (D) stage signal is applied with the state of the engine clutch unknown;
    determining, by the processor, whether an engine speed is less than a preset second speed when the motor speed exceeds the first speed; and
    determining, by the processor, that the engine clutch is in the open state when the engine speed is less than the preset second speed for a predetermined period of time and determining that the engine clutch not in the closed state when the engine speed is greater than the preset second speed for the predetermined period of time.

13. The method of claim 10, further comprising:

determining, by the processor, that the engine clutch is in the closed state when it is unknown from a determination result on the closed state of the engine clutch during application of a reverse (R) or drive (D) stage signal that the engine clutch is in the closed state or in the open state.

14. The method of claim 10, further comprising:

restricting, by the processor, the reverse rotation of the motor for the reverse driving control of the vehicle in response to determining that the engine clutch is in the closed state.

15. A vehicle system, comprising:

an engine clutch configured to couple or release an engine and a motor of a vehicle;

an engine clutch controller configured to control a closed state or an open state of the engine clutch; and a driving control apparatus configured to determine whether the engine clutch is in the closed state or the open state, based on a state of the motor or the engine of the vehicle when a state of the engine clutch is unknown by the engine clutch controller and to allow reverse rotation of the motor for reverse driving control of the vehicle in response to determining that the engine clutch is in the open state, wherein when a reverse (R) stage signal is applied with the state of the engine clutch unknown, the driving control apparatus is configured to adjust a hybrid starter generator (HSG) speed to 0 and a motor torque of the motor to a first torque within an HSG torque range, and wherein the driving control apparatus is configured to determine that the engine clutch is in the open state when an absolute value of an HSG torque is less than a preset second torque for a predetermined period of time that the HSG speed and the motor torque of the motor is adjusted.

\* \* \* \* \*